(12) United States Patent
Tang et al.

(10) Patent No.: US 9,397,571 B2
(45) Date of Patent: Jul. 19, 2016

(54) CONTROLLED DELIVERY OF A CHARGING CURRENT TO A BOOST CAPACITOR OF A VOLTAGE REGULATOR

(75) Inventors: Joel Tang, Sembawang (SG); Qingxiang Zhang, Tai Po (CN); Seth Kahn, San Francisco, CA (US); David Lidsky, Oakland (CA)

(73) Assignee: Volterra Semiconductor Corporation, Fremont, CA (US)

( * ) Notice: Subject to any disclaimer, the term of this patent is extended or adjusted under 35 U.S.C. 154(b) by 757 days.

(21) Appl. No.: 13/166,677

(22) Filed: Jun. 22, 2011

(65) Prior Publication Data
US 2011/0316500 A1 Dec. 29, 2011

Related U.S. Application Data

(60) Provisional application No. 61/357,685, filed on Jun. 23, 2010.

(51) Int. Cl.
*H02M 3/158* (2006.01)
*H02M 3/156* (2006.01)
*H02M 1/00* (2006.01)

(52) U.S. Cl.
CPC .......... *H02M 3/1588* (2013.01); *H02M 3/1563* (2013.01); *H02M 2001/0003* (2013.01); *Y02B 70/1466* (2013.01)

(58) Field of Classification Search
CPC .............. H02M 3/33538; H02M 3/33546; H02M 3/33515; H02M 3/33576; H02M 3/33592; H02M 3/33553; H02M 3/33507; H02M 3/33523; H02M 1/32; H02M 1/34; H02M 7/48; H02M 3/28; H02M 3/315; H02M 7/515; H02M 7/53; H02M 7/537; H02H 7/1222

USPC ......... 323/234, 237, 265, 266, 271, 273, 274, 323/275, 282, 284, 285
See application file for complete search history.

(56) References Cited

U.S. PATENT DOCUMENTS

| | | | | |
|---|---|---|---|---|
| 4,835,467 | A * | 5/1989 | Gokhale | ........................ 324/166 |
| 5,663,628 | A * | 9/1997 | Fujii | .............................. 362/183 |
| 5,770,940 | A * | 6/1998 | Goder | ............................ 323/282 |
| 5,847,554 | A | 12/1998 | Wilcox et al. | |
| 6,020,729 | A | 2/2000 | Stratakos et al. | |
| 6,160,441 | A | 12/2000 | Stratakos et al. | |
| 6,225,795 | B1 | 5/2001 | Stratakos et al. | |
| 6,278,264 | B1 | 8/2001 | Burstein et al. | |
| 6,445,244 | B1 | 9/2002 | Stratakos et al. | |

(Continued)

OTHER PUBLICATIONS

Analog Devices, (2007) "Low Duty Cycle, 600 rnA, 3 MHz Synchronous Step-Down DC-to-DC Converter," ADP2102 (Product Design Brochure), *Analog Devices, Inc.*, 24 pp.

(Continued)

*Primary Examiner* — Jeffrey Gblende
(74) *Attorney, Agent, or Firm* — Weaver Austin Villeneuve & Sampson LLP

(57) ABSTRACT

Disclosed are devices, apparatus, circuitry, components, mechanisms, modules, units, systems, and processes for controlling a power switch of a voltage regulator. A capacitor is coupled to an output of the power switch. Charge delivery circuitry is coupled to the capacitor and configured to provide a charging current to the capacitor. Charge control circuitry can be coupled to the charge delivery circuitry and configured to selectively allow the providing of the charging current to the capacitor.

31 Claims, 11 Drawing Sheets

(56) References Cited

U.S. PATENT DOCUMENTS

| | | |
|---|---|---|
| 6,462,522 B2 | 10/2002 | Burstein et al. |
| 6,476,589 B2 | 11/2002 | Umminger et al. |
| 6,664,774 B2 | 12/2003 | Lethellier |
| 6,713,823 B1 | 3/2004 | Nickel |
| 7,170,267 B1 | 1/2007 | McJimsey |
| 7,245,113 B2 | 7/2007 | Chen et al. |
| 8,018,208 B1 | 9/2011 | Kahn et al. |
| 8,120,342 B1 | 2/2012 | Kahn et al. |
| 8,283,902 B1 | 10/2012 | Kahn et al. |
| 8,629,669 B2 | 1/2014 | Tournatory et al. |
| 8,779,744 B2 | 7/2014 | Kahn |
| 2005/0057239 A1* | 3/2005 | Fowler et al. .......... 323/282 |
| 2007/0024261 A1* | 2/2007 | Wong et al. .......... 323/288 |
| 2007/0097578 A1* | 5/2007 | Bartolo et al. .......... 361/93.1 |
| 2008/0100378 A1* | 5/2008 | Bernacchia .......... 327/589 |
| 2008/0278135 A1* | 11/2008 | De Lima Filho et al. ..... 323/288 |
| 2009/0108908 A1* | 4/2009 | Yamadaya .......... 327/390 |
| 2010/0007295 A1* | 1/2010 | Yang et al. .......... 318/400.22 |
| 2010/0148741 A1* | 6/2010 | Chen et al. .......... 323/285 |
| 2012/0025796 A1 | 2/2012 | Kahn |
| 2012/0025799 A1 | 2/2012 | Tournatory et al. |

OTHER PUBLICATIONS

Analog Devices, (2009-2010) "Synchronous Current-Mode with Constant On-Time, PWM Buck Controller," ADP1872/ADP1873 (Product Design Brochure), *Analog Devices, Inc.*, 40 pp.

Chetty, P.R.K. (Copyright 1986) "Switch-Mode Power Supply Design," *TAB Professional and Reference Books*, 5 pp.

Linear Technology, (2008) "2.5A, 10V, Monolithic Synchronous Step-Down Regulator," LTC3602 (Product Design Brochure), *Linear Technology Corporation*, 20 pp.

Maxim, (Oct. 2003) "3A, 1MHz, 1% Accurate, Internal Switch Step-Down Regulator with Power-OK," MAX8505 (Product Design Brochure), *Maxim Integrated Products*, 15 pp.

* cited by examiner

CONTROLLED DELIVERY OF A CHARGING CURRENT TO A BOOST CAPACITOR OF A VOLTAGE REGULATOR

PRIORITY CLAIM

This disclosure claims priority to U.S. Provisional Patent Application No. 61/357,685, filed Jun. 23, 2010, titled MECHANISM FOR PROVIDING A CHARGING CURRENT TO A BOOST CAPACITOR OF A VOLTAGE REGULATOR, by Tang, et al. and assigned to the assignee hereof. The disclosure of the prior application is hereby incorporated by reference in its entirety and for all purposes.

BACKGROUND

This disclosure relates generally to voltage regulators and, more particularly, to the architecture and control mechanisms of switching voltage regulators.

Voltage regulators, such as direct current (DC) to DC converters, are used to provide stable voltage sources for electronic devices and systems. The general purpose of a voltage regulator is to convert a source voltage, such as the voltage of an alternating current (AC) or DC power source, into the operating DC voltage of an electronic device. By way of example, efficient DC to DC converters can be used in applications including battery management in low power devices, such as laptop notebooks and cellular phones.

Switching voltage regulators, often referred to as "switching regulators," are a type of DC to DC converter that convert one DC voltage to another DC voltage with high efficiency. A switching regulator generates an output voltage by converting an input DC voltage into a high frequency voltage, and filtering the high frequency voltage to produce the output DC voltage.

Conventional switching regulators typically include a switch for alternately coupling and decoupling an unregulated input DC voltage source, such as a battery, to a load, such as an integrated circuit. An output filter, typically including an inductor and a capacitor, is coupled between the switch and the load to filter the output of the switch and thus provide the output DC voltage. Power is transmitted through the switch and into the output filter in the form of discrete current pulses. The switching regulator operates on the principle of storing energy in the inductor during one portion of a cycle and then transferring the stored energy to the capacitor in the next portion of the cycle. The output filter converts the current pulses into a steady load current so that the voltage across the load is regulated.

SUMMARY

The devices, apparatus, circuitry, components, mechanisms, modules, units, systems, and processes of this disclosure each have several innovative aspects, no single one of which is solely responsible for the desirable attributes disclosed herein.

According to one aspect of this disclosure, a capacitor is coupled to an output of a power switch of a voltage regulator. Charge delivery circuitry is coupled to the capacitor and configured to provide a charging current to the capacitor. Charge control circuitry can be coupled to the charge delivery circuitry and configured to selectively allow the providing of the charging current to the capacitor.

In some implementations, the charge control circuitry includes a comparator coupled to sense a differential voltage across the capacitor. The comparator is configured to selectively allow the providing of the charging current responsive to the sensed differential voltage crossing a threshold voltage. The comparator can be DC-coupled or AC-coupled to the capacitor terminals, depending on the desired implementation. In some other implementations, the charge control circuitry includes an amplifier coupled to sense a voltage across the capacitor. The amplifier is operatively coupled as part of a feedback loop to provide a feedback signal to drive the capacitor voltage to a reference voltage. The amplifier can be coupled to provide the feedback signal to the charge delivery circuitry. In some instances, the charging current is the feedback signal.

In some implementations, the power switch control circuitry further includes charge removal circuitry coupled to the output of the power switch. The charge removal circuitry is configured to remove current from the output of the power switch. The charge control circuitry can be coupled to the charge removal circuitry, in which case the charge control circuitry is further configured to selectively allow the removal of the current from the output of the power switch.

According to another aspect of this disclosure, a process for controlling a power switch of a voltage regulator includes sensing a voltage across a capacitor coupled to an output of the power switch, and selectively allowing the providing of a charging current to the capacitor responsive to the sensed voltage. In some implementations, the providing of the charging current is selectively allowed when it is determined that high side and low side switch components of the power switch have an off state.

According to another aspect of this disclosure, a voltage regulator includes an output filter capable of being coupled to a load and a power switch coupled to the output filter at a switching node. The power switch is configured to provide a first voltage at the switching node during a first conduction period and a second voltage at the switching node during a second conduction period. A capacitor has a first terminal and a second terminal, the first terminal being coupled to the switching node. Charge delivery circuitry is coupled to the second terminal of the capacitor. The charge delivery circuitry is configured to provide a charging current to the capacitor. Charge control circuitry is coupled to the charge delivery circuitry. The charge control circuitry is configured to selectively allow the providing of the charging current to the capacitor.

Details of embodiments and implementations are set forth in the accompanying drawings and the description below. Various features and aspects of the disclosed subject matter may be realized by reference to the remaining portions of the specification and the drawings. Note that the relative dimensions of the following figures may not be drawn to scale.

BRIEF DESCRIPTION OF THE DRAWINGS

The included drawings are for illustrative purposes and serve only to provide examples of possible structures and process steps for the disclosed inventive devices, apparatus, circuitry, components, mechanisms, modules, units, systems, and processes.

Like reference numbers and designations in the various drawings indicate like elements.

DETAILED DESCRIPTION OF SPECIFIC EMBODIMENTS

Figure 1A:
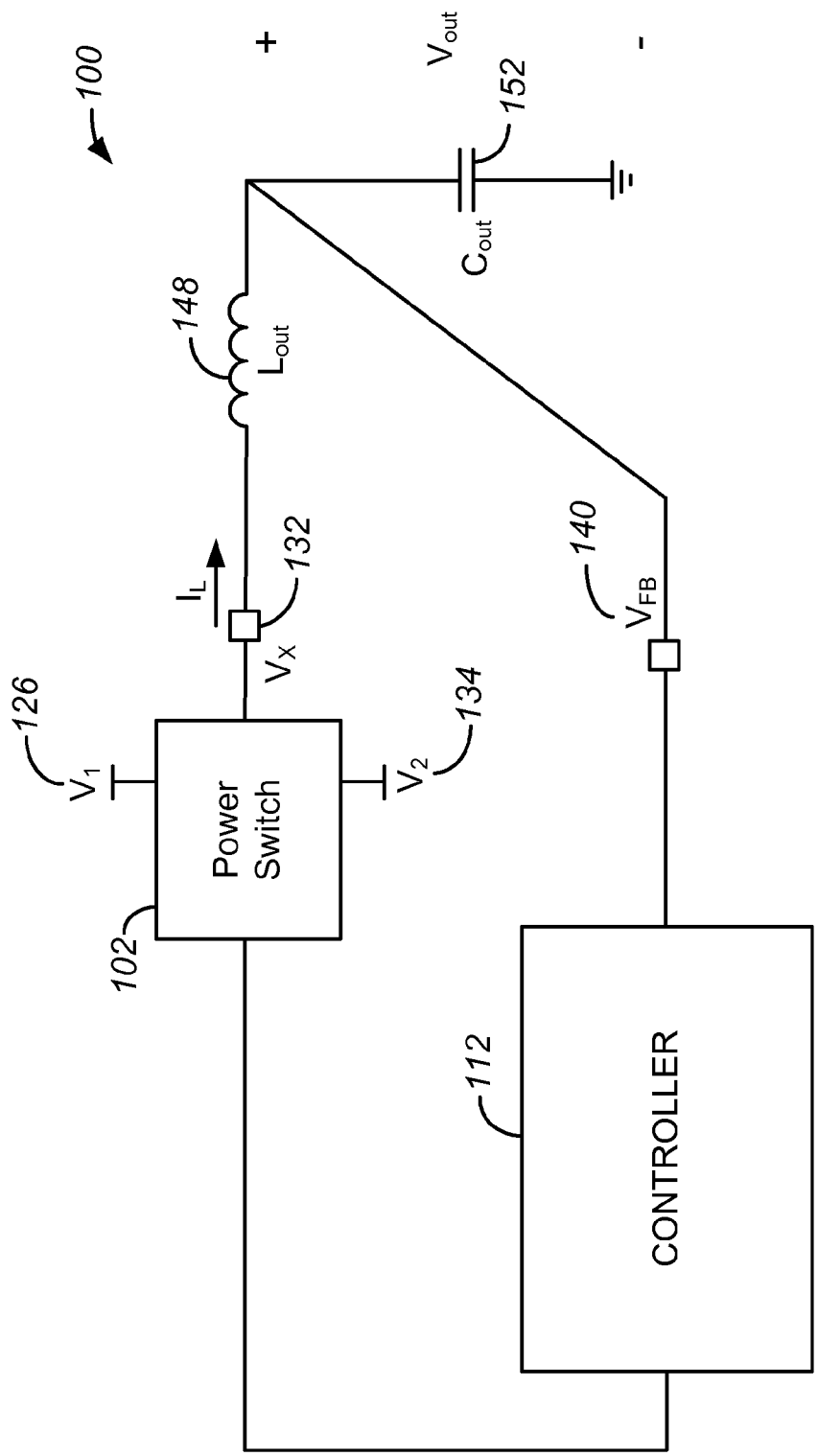
FIG. 1A is a simplified diagram of components of a voltage regulator 100, according to an embodiment of the invention.

Reference will now be made in detail to specific embodiments including the best modes contemplated by the inventors. Examples of these specific embodiments are illustrated in the accompanying drawings. While the disclosed subject matter is described in conjunction with these specific embodiments, it will be understood that it is not intended to be limited to the described embodiments. On the contrary, it is intended to cover alternatives, modifications, and equivalents as may be included within the spirit and scope of the invention as defined by the appended claims. In the following description, specific details are set forth in order to provide a thorough understanding of the disclosed subject matter. The disclosed subject matter may be practiced without some or all of these specific details. In addition, well-known features may not have been described in detail to avoid unnecessarily obscuring the disclosed subject matter.

Embodiments of the disclosed devices, apparatus, circuitry, components, mechanisms, modules, units, systems, and processes provide techniques for controlling the delivery of charge to a boost capacitor coupled at the output of a power switch of a voltage regulator. An example of such a boost capacitor is referred to in the art as a "boot strap" capacitor. A boost capacitor can be used to drive a high side switch component of a power switch. The boost capacitor is generally used to maintain a local supply domain relative to an output voltage of a power switch at a switching node, Vx, described in greater detail below. The power switch output voltage swings depending on the state of the power switch. In one example, the boost capacitor maintains a supply voltage ("$V_{BST}$") relative to node Vx for an n-channel FET serving as the high side switch component of the power switch as Vx transitions high and low depending on the power switch state. Embodiments of the disclosed circuitry can be incorporated into voltage regulators to ensure that the boost capacitor provides sufficient charge to facilitate turning on and off a switch component of a power switch, for instance, turning on/off the gate of a FET serving as the high side switch component, as further described below.

In some embodiments, a charging current can be selectively delivered to the boost capacitor at appropriate times, for instance, when both the high side switch component and the low side switch component of the power switch are turned off, or when one or more transistors in the power switch of the voltage regulator enter tri-state, as may occur in a discontinuous conduction mode implementation of a voltage regulator. Delivery of such charging currents can be desirable when the duration that the high side transistors is on is so long, or the duration that the high side and low side transistors remain in tri-state is so long, that a significant portion of the charge stored in the boost capacitor could be depleted, depending on the load current drawn from the boost capacitor. This load current can come from one or more factors such as transistor leakage, high side switch turn on, and active circuitry quiescent current. Without such assistance, the boost capacitor charge could deplete to such a level that the voltage the boost capacitor supplies is too low for nominal operation of the circuitry relying upon it. Thus, for example, the next turn-on of the high side transistor might not be possible.

The disclosed devices, apparatus, circuitry, components, mechanisms, modules, units, systems, and processes can be incorporated to generate, provide, maintain, and selectively allow and disallow the delivery of the charging current to the boost capacitor.

The disclosed embodiments generally relate to and can be incorporated in switching voltage regulators and specific components thereof to facilitate voltage conversion. These embodiments are generally described in relation to DC to DC converters that employ buck topologies (also referred to as buck regulators), which convert an input DC voltage to a lower output DC voltage of the same polarity. It should be understood that embodiments are contemplated in which other topologies are employed in various combinations.

FIG. 1A is a simplified diagram of components of a voltage regulator 100, according to an embodiment of the invention. The voltage regulator 100 includes three main components: a power switch 102, a controller 112, and an output filter including an output inductor 148 and an output capacitor 152. The power switch 102 is coupled to the output filter at a switching node 132 ("Vx"). In particular, the power switch 102 has an output coupled to an input of inductor 148 at node Vx. An output of inductor 148 is coupled to a first terminal of output capacitor 152, while a second terminal of output capacitor 152 is coupled to ground. The output capacitor 152 can be coupled to a load (not shown) such as an integrated circuit.

In FIG. 1A, the power switch 102 controls the flow of current into inductor 148 of the output filter at Vx. This inductor current is referred to herein as "$I_L$." The power switch 102 is generally configured to alternately couple the output filter at Vx to a first voltage 126 ("$V_1$") and a second voltage 134 ("$V_2$"). In one example, $V_1$ can be a supply voltage, that is, an input voltage source to be regulated, and $V_2$ can be another voltage, such as ground. In some implementations, driver and control circuitry can be coupled to an input of power switch 102, that is, between controller 112 and power switch 102, as further described below with reference to FIG. 1B. Such driver and control unit(s) generally include circuitry and logic configured to drive the switching of power switch 102 between $V_1$ and $V_2$. The driver and control unit(s) can also include protection circuitry, and other various analog and/or digital circuitry to monitor voltages and interact with components of the power switch 102. As used herein, such driver and control circuitry is generally considered separate circuitry from power switch 102, and is omitted from FIG. 1A for purposes of illustration. Depending on the desired implementation, the driver and control unit(s) can be located on a different chip from power switch 102, located on the same chip as power switch 102, and/or located on the same or different chip as controller 112.

In FIG. 1A, the controller 112 is operatively coupled to control the alternate switching of power switch 102 between $V_1$ and $V_2$ responsive to a feedback signal from the output filter. In the illustrated example, the controller 112 has an input coupled to sense a feedback voltage 140 ("$V_{FB}$") at the output filter, that is, at a node between inductor 148 and capacitor 152, and an output coupled to the input of power switch 102 to control the switching of power switch 102 responsive to the sensed voltage $V_{FB}$. In alternative implementations, the input of controller 112 can be coupled to other nodes of voltage regulator 100, such as Vx.

Figure 1B:
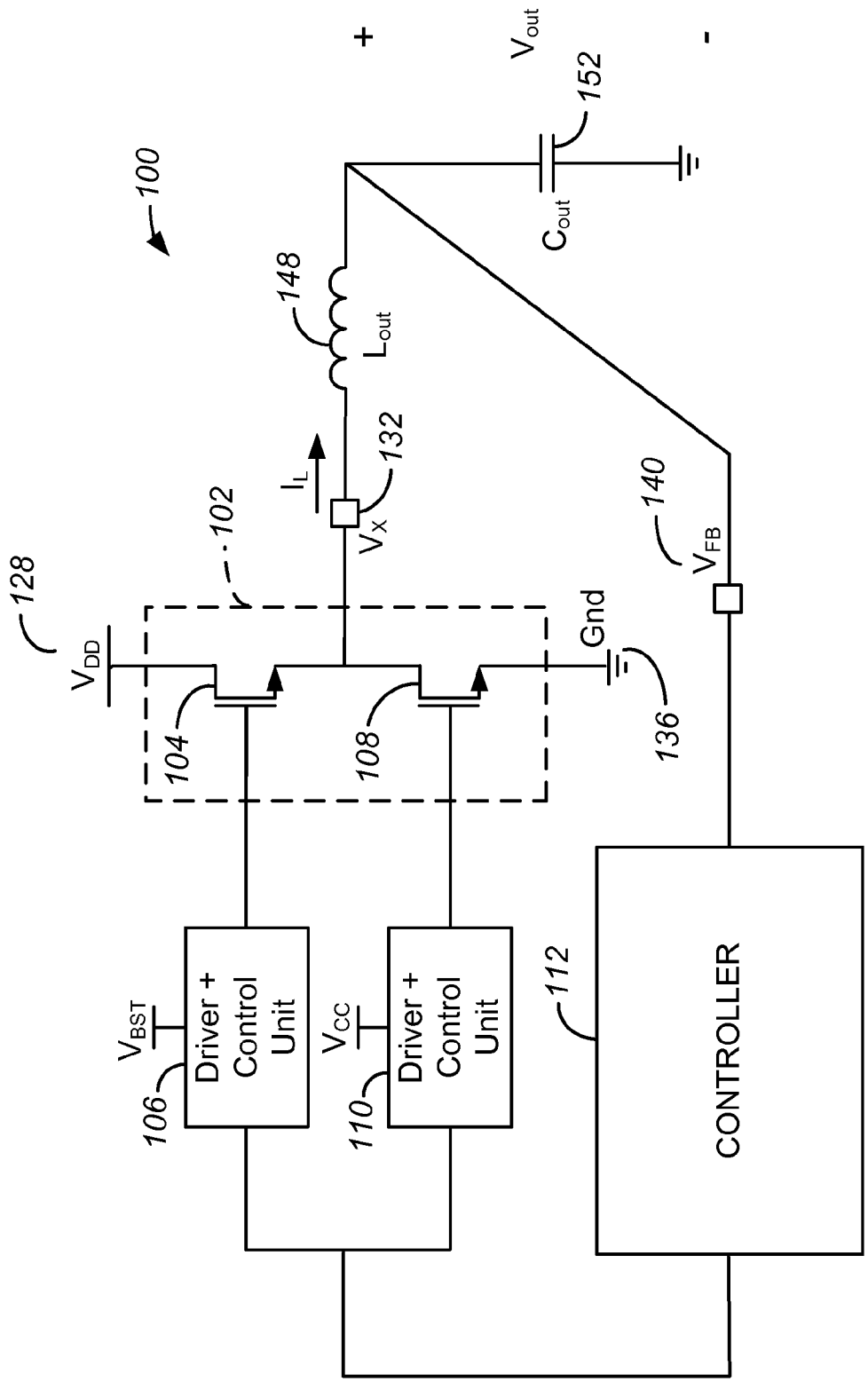
FIG. 1B is a simplified diagram of components of voltage regulator 100, showing one example of a power switch 102 and an example of driver and control circuitry, according to an embodiment of the invention.

FIG. 1B is a simplified diagram of components of a voltage regulator 100, showing one example of a power switch 102 and an example of driver and control circuitry, according to an embodiment of the invention. In this example, power switch 102 incorporates a "high side" switch component 104, such as a transistor, and a "low side" switch component 108, such as a transistor or a diode. Here, the high side switch component 104 is coupled to a supply voltage 128 ("$V_{DD}$"), while the low side switch component 108 is coupled to ground ("Gnd") 136. As used herein, a high side or low side switch component can be referred to as a high side or low side "switch."

In FIG. 1B, the high side switch 104, in the form of a transistor, is configured to selectively couple the output filter at node Vx to $V_{DD}$, while the low side switch 108, in the form of a separate transistor, is configured to selectively couple the output filter at node Vx to Gnd. In this illustrative example, an upper driver and control unit 106 is coupled to a gate of the transistor serving as high side switch 104, and a lower driver and control unit 110 is coupled to a gate of the transistor serving as low side switch 108. The driver and control units 106 and 110 are configured to drive the alternate on/off switching of high side switch 104 and low side switch 108 so Vx is alternately coupled between $V_{DD}$ and ground. The driver and control units 106 and 110 have inputs coupled to the output of controller 112 so that controller 112 causes driver and control units 106 and 110 to alternate between: (i) switching high side switch 104 on while low side switch 108 is switched off, and (ii) switching low side switch 108 on while high side switch 104 is switched off. The relative time spent with the high side switch enabled compared to the low side switch enabled determines an output voltage ("Vout") developed across capacitor 152 of the output filter. In FIG. 1B, the driver and control units 106 and 110 are configured to cooperate with one another in controlling the high side switch 104 and low side switch 108 states, for example, to ensure both are not turned on at the same time.

A transistor incorporated into a high side or low side switch of power switch 102 as described above can be implemented as a FET, such as a metal oxide semiconductor field effect transistor ("MOSFET"), as illustrated in FIG. 1B. The high side FET(s) of high side switch 104 can be p-channel or n-channel, depending on the desired implementation. In an alternative embodiment, a different type of transistor is used, such as a junction gate field effect transistor ("JFET"). In the example of FIG. 1B, while high side switch 104 is illustrated as one FET, the high side switch 104 can be implemented to include one or more transistors, such as n-channel FETs, and the low side switch 108 can also be implemented to include one or more transistors, such as n-channel FETs. For example, the high side switch 104 could include a number of transistors coupled in parallel and acting in unison. The switching node Vx at the output of power switch 102 is situated between the high side FET and the low side FET, in this implementation, between the source of the high side FET and the drain of the low side FET.

Figure 2A:
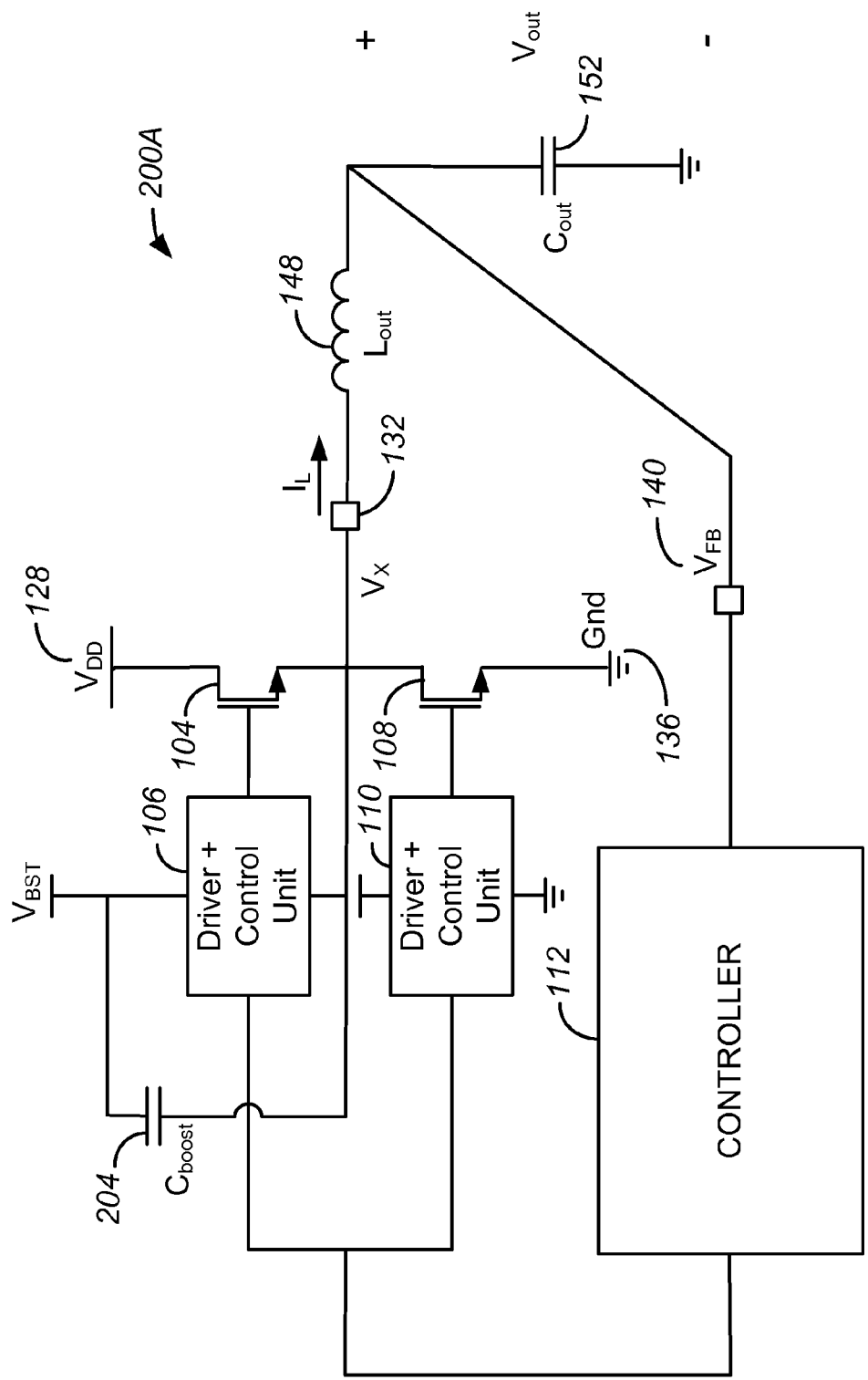
FIG. 2A is a simplified diagram of components of a voltage regulator 200A, incorporating a boost capacitor, according to an embodiment of the invention.

FIG. 2A is a simplified diagram of a voltage regulator 200A, incorporating a boost capacitor, according to an embodiment of the invention. In a voltage regulator such as a DC to DC converter that incorporates high side n-channel FETs as the high side switch, a boost capacitor 204 can be used to drive the gate voltage of such transistors. The boost capacitor 204 can be internal, that is, located on the same chip as the power switch 102 of FIG. 1A, or it can be external, i.e., located off-chip, or a combination of both. In one embodiment, a first terminal of this boost capacitor 204 is connected at node Vx, that is, to the source terminal of a high side n-channel FET serving as high side switch 104. In the illustrated embodiment, a second terminal of the boost capacitor 204 can be connected to a boost supply voltage, $V_{BST}$, which can also be coupled to power other control circuitry including driver and control unit 106, in some implementations. The $V_{BST}$ domain, also referred to herein as a floating domain, is maintained relative to Vx instead of to Gnd. As the Vx voltage swings up and down depending on the power switch state, the $V_{BST}$ voltage moves up and down with the Vx voltage. In some implementations, a separate supply voltage, Vcc, as illustrated in FIG. 1B, is used to drive the low side driver and control unit 110. In the continuous conduction mode of operation, boost capacitor 204 is often charged when the low side switch 108 is turned on by virtue of connecting a shorting switch (not shown) from $V_{BST}$ to Vcc when the low side switch is turned on. Typically, the boost capacitor 204 is partially discharged when the high side switch 104 turns on. Preferably, the capacitance ("$C_{boost}$") of the capacitor 204 is appropriate to ensure a constant boost current supply to drive the high side n-channel FET, for instance, significantly larger than the high side switch gate capacitance.

In a DC to DC converter application that allows discontinuous modes of operation, both the high side and low side switches 104 and 108 could go into tri-state. In regulation, the duration that these switches remain in tri-state may be dependent on the output load current, that is, the current delivered to the load connected across capacitor 152 of the output filter. As load current decreases, the switches may remain in tri-state for longer periods. During long periods of tri-state, the charge stored at boost capacitor 204 could be depleted, depending on the boost domain loading conditions. At or near zero load current, the power switch could remain in tri-state indefinitely. In absence of a boost re-charge during low side switch turn on, it is possible for the charge at boost capacitor 204 to deplete to such a level that subsequent activation of the high side switch, such as a high-side re-channel FET, cannot be achieved.

Figure 2B:
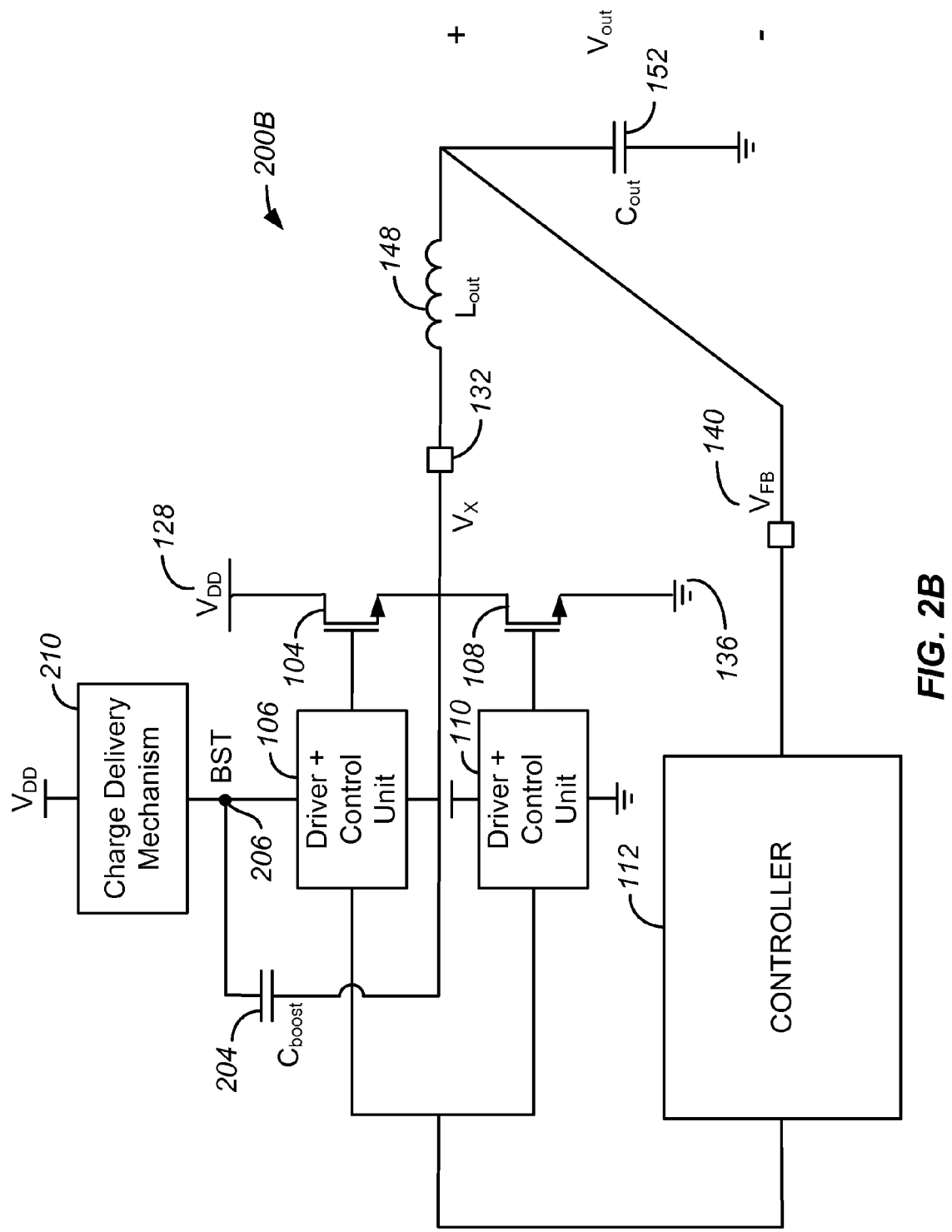
FIG. 2B is a simplified diagram of components of a voltage regulator 200B, incorporating a charge delivery mechanism for a boost capacitor, according to an embodiment of the invention.

FIG. 2B is a simplified diagram of components of a voltage regulator 200B, incorporating a charge delivery mechanism for a boost capacitor, according to an embodiment of the invention. As shown in FIG. 2B, some embodiments of the present invention incorporate a charge delivery mechanism 210 for delivering charge to the boost capacitor 204, for instance, in situations where FET tri-state of switches 104 and 108 has occurred during discontinuous mode of operation. In the illustrated embodiment, charge delivery mechanism 210 is coupled to the second terminal of the boost capacitor, referred to herein as node BST 206. The charge delivery mechanism is configured to selectively provide charge to boost capacitor 204 as further described herein.

Figure 3A:
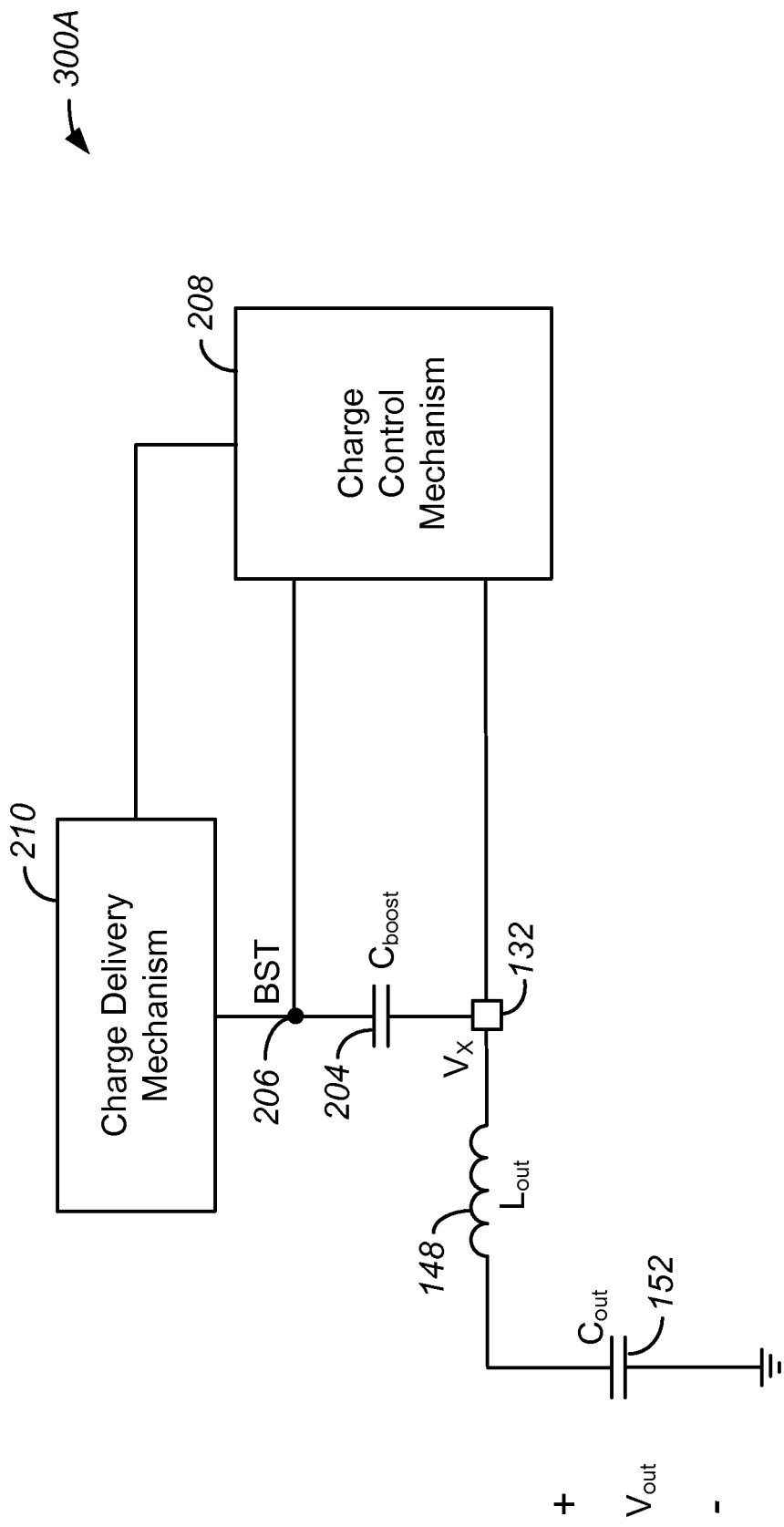
FIG. 3A is a simplified diagram of a control circuit 300A for providing charge to a boost capacitor of a voltage regulator, according to an embodiment of the invention.

FIG. 3A is a simplified diagram of a control circuit 300A for providing charge to a boost capacitor of a voltage regulator, according to an embodiment of the invention. The first terminal of capacitor 204 is coupled to node Vx 132, and the second terminal is coupled to node BST 206, as explained above. A charge control mechanism 208 has two inputs, the first coupled to the first terminal of boost capacitor 204 at node Vx and the second coupled to the second terminal of boost capacitor 204 at node BST.

In FIG. 3A, the control circuit 300A further includes the charge delivery mechanism 210 coupled to the boost capacitor to provide an appropriate charge. In this embodiment, charge delivery mechanism 210 is configured to deliver a charging current to node BST, i.e., at the second terminal of boost capacitor 204. The charge control mechanism 208 cooperates with charge delivery mechanism 210 to selectively allow and disallow the providing of the charging current to the boost capacitor 204 at node BST. The charge control mechanism 208 can directly interact with charge delivery mechanism 210, in some implementations, or indirectly through a charge removal mechanism, as explained below. Examples of controlling operations, events to which charge control mechanism 208 responds, and circuit configurations within charge control mechanism 208 are described below.

Figure 3B:
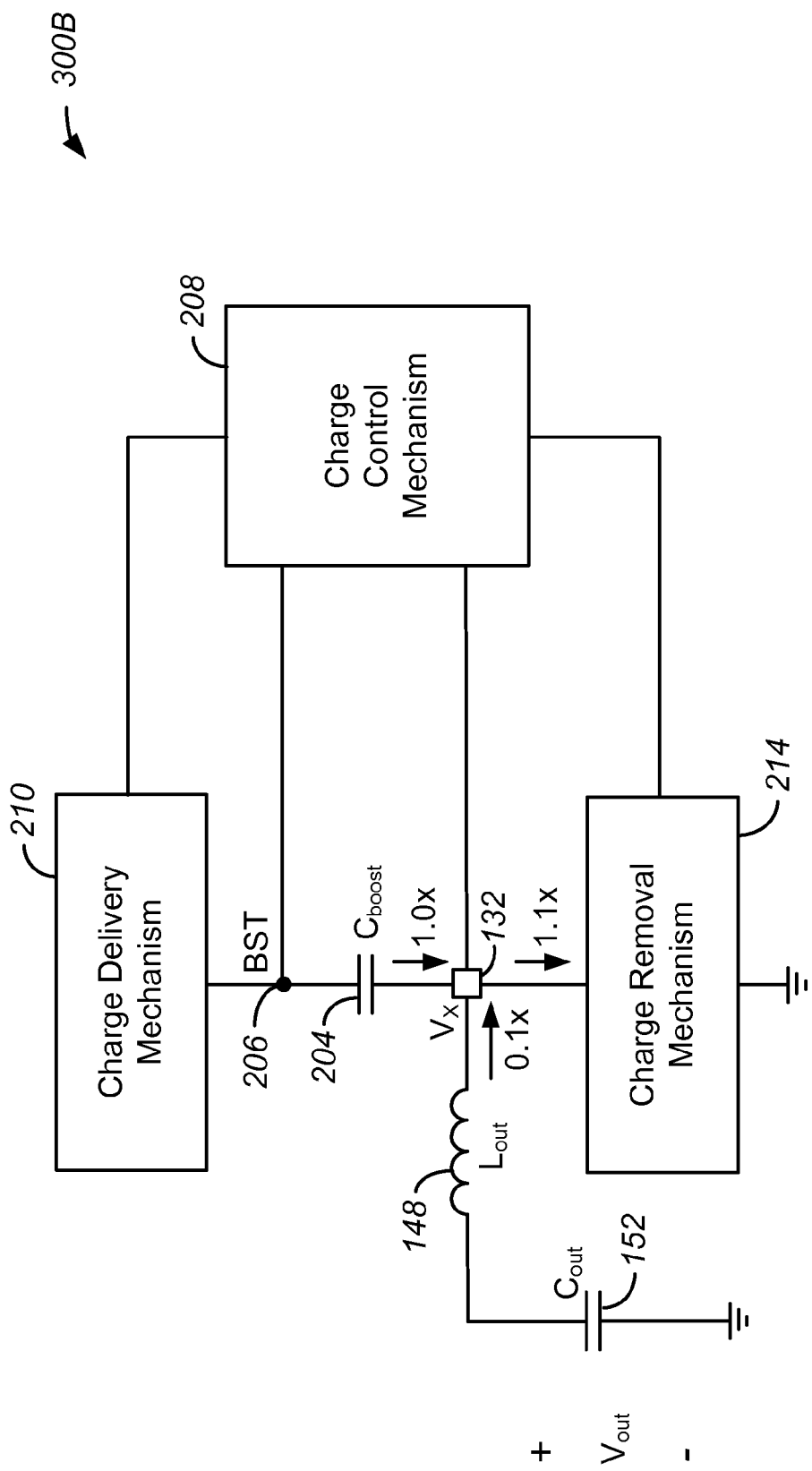
FIG. 3B is a simplified diagram of a control circuit 300B for providing charge to and removing charge from a boost capacitor of a voltage regulator, according to an embodiment of the invention.

FIG. 3B is a simplified diagram of a control circuit 300B for providing charge to and removing charge from a boost capacitor of a voltage regulator, according to an embodiment of the invention. In FIG. 3B, the control circuit 300B includes a charge control mechanism 208 and a charge delivery mechanism 210 as described above. In FIG. 3B, the control circuit 300B further includes a charge removal mechanism 214 coupled to node Vx and configured to remove charge from Vx, i.e., at the first terminal of boost capacitor 204, for example, by delivering the current to ground as explained below. In the example of FIG. 3B, the charge control mechanism 208 is coupled to interact with charge delivery mechanism 210 and charge removal mechanism 214. In this embodiment, charge control mechanism 208 cooperates with charge delivery mechanism 210 and charge removal mechanism 214 to selectively allow and disallow the providing of charging current to node BST in conjunction with the removal of current at node Vx.

In some implementations, charge removal mechanism 214 can be configured to remove slightly more current from node Vx than is delivered to the boost capacitor 204 by charge delivery mechanism 210. In this way, the net current delivered to node Vx will be negative so that output capacitor 152 is not charged during the process of charging boost capacitor 204. This can be desirable to prevent current from flowing into the output filter and causing the output voltage, Vout, to rise. Thus, in the example of FIG. 3B, at node Vx, the net current pulled to ground through charge removal mechanism 214 (e.g., 1.1×) removes the current flowing into Vx from charge delivery mechanism 210 (e.g., 1.0×) and causes the difference in current (e.g., 0.1×) to flow from node Vx to Gnd to ensure a safety margin from errors in the charging and discharging currents accidentally charging up the output voltage.

Figure 4A:
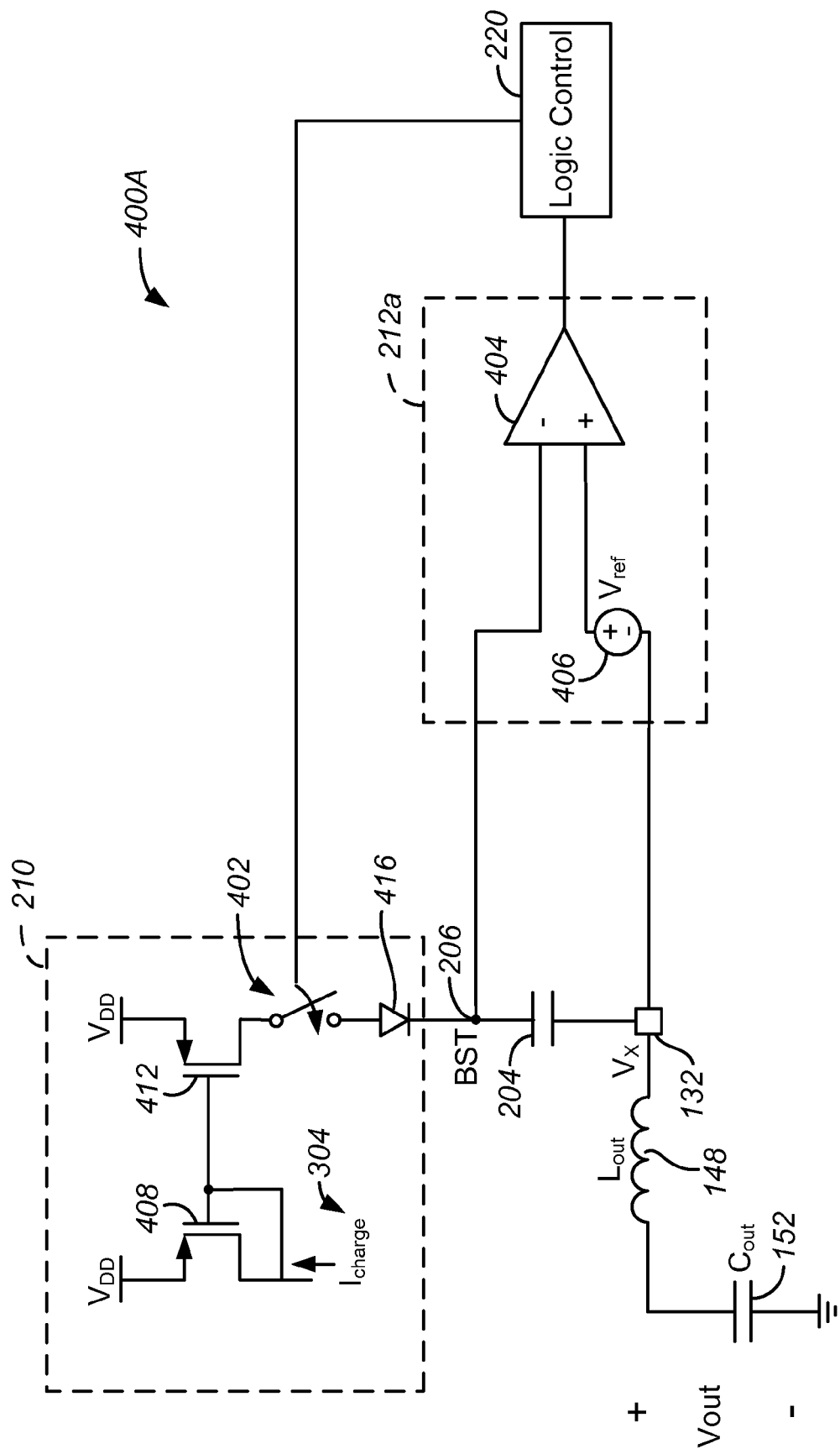
FIG. 4A is a simplified diagram of a control circuit 400A for providing charge to a boost capacitor of a voltage regulator, according to an embodiment of the invention.

FIG. 4A is a simplified diagram of a control circuit 400A for providing charge to a boost capacitor of a voltage regulator, according to an embodiment of the invention. FIG. 4A shows one implementation of a charge control mechanism 208 and a charge delivery mechanism 210, as described above. In the embodiment of FIG. 4A, the charge control mechanism 208 of FIG. 3A is implemented to include a comparator mechanism 212a coupled to sense a differential voltage across the boost capacitor 204. In particular, comparator mechanism 212a includes a voltage comparator 404 having a first input coupled to sense the voltage at node Vx of the capacitor and a second input coupled to sense the voltage at node BST of capacitor 204. In this embodiment, responsive to the determined differential voltage crossing a threshold, comparator mechanism 212a is configured to selectively allow and disallow the providing of a charging charge by charge delivery mechanism 210.

In particular, the comparator mechanism 212a can turn on/off the charging current when the differential voltage across the boost capacitor crosses a designated threshold level, represented in FIG. 4A as a reference voltage ("Vref"). The reference voltage 406 can be generated by appropriate voltage supply circuitry 406 coupled to provide Vref between node Vx and one of the inputs to comparator 404. For instance, when the voltage at the BST node less the voltage at node Vx drops below the threshold value of Vref, the output of comparator 404 goes high, causing logic control module 220 to close a switch 402, allowing a charging current 304 ("Icharge") to charge capacitor 204. When the sensed voltage at the input of comparator 404 exceeds the Vref threshold value, the output of comparator 404 goes low, causing the switch 402 to open, thus stopping Icharge 304 from being delivered to capacitor 204. In the example of FIG. 4A, this control is provided through a logic control module 220, coupled between the output of comparator mechanism 212 and switch 402 of charge delivery mechanism 210. The operations described herein can be implemented with many alternative embodiments. For example, the sensing of the $V_{BST}$ to Vx voltage can be done with a resistor divider and compared to a reference voltage that is fractionally the desired overall $V_{BST}$ to Vx voltage. The reference voltage does not need to be a constant target but can vary depending on several parameters, such as tracking process changes or temperature; or otherwise dynamic and chosen carefully to achieve particular performance advantages.

In FIG. 4A, a designated charging current 304, Icharge, can be provided through charge delivery mechanism 210 to charge the boost capacitor 204. Icharge can be supplied from a current reference source capable of being connected to control circuit 400A. In some implementations, this current is larger than the quiescent current drawn from boost capacitor 204 during FET tri-state. In the example of FIG. 4A, charge delivery mechanism 210 is implemented to include current mirror circuitry including current mirror transistors 408 and 412 connected as shown in FIG. 4A. In this particular example, Icharge is delivered to the drain of p-channel FET 408 and mirrored at p-channel FET 412. The gates of FETs 408 and 412 are coupled to one another, and the supplies of both FETs 408 and 412 are coupled to the $V_{DD}$ supply voltage. In this way, FETs 408 and 412 are operatively coupled to provide Icharge to the BST node 206 of capacitor 204. The comparator mechanism 212a and logic control module 220 are operatively coupled to close or open the switch 402 to allow or disallow the delivery of Icharge from charge delivery mechanism 210 to BST node 206.

In the example of FIG. 4A, the charge delivery mechanism 210 is implemented to include a diode 416 connected between switch 402 and the BST node to prevent possible backflow of current from boost capacitor 204 when Vx is pulled to $V_{DD}$, for instance, when the high side switch 104 turns on. In other examples, diode 416 is omitted.

Figure 4B:
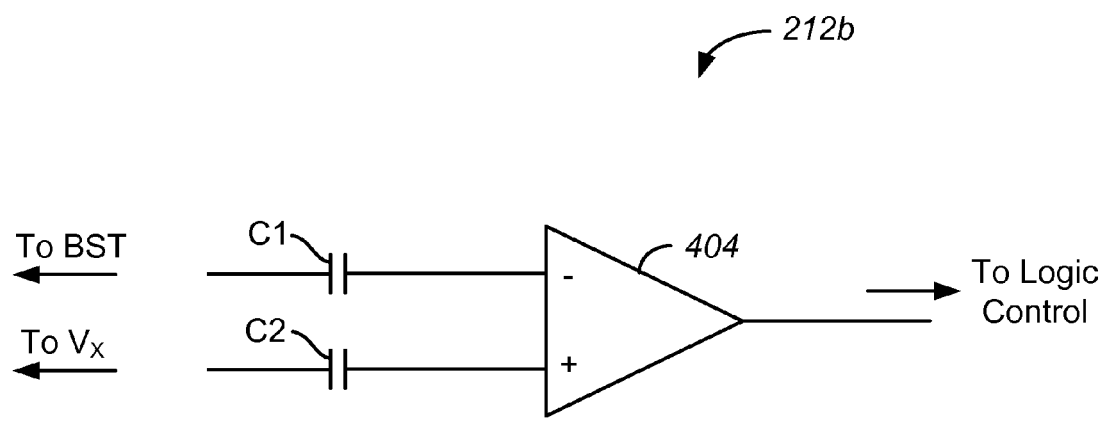
FIG. 4B is a simplified diagram of a comparator mechanism 212b as part of a charge control mechanism 208 for controlling the delivery of charge to a boost capacitor of a voltage regulator, according to an embodiment of the invention.

FIG. 4B is a simplified diagram of a comparator mechanism 212b as part of a charge control mechanism 208 for controlling the delivery of charge to a boost capacitor of a voltage regulator, according to an embodiment of the invention. The circuitry of FIG. 4B is an alternative example of components of a comparator mechanism for controlling the provision of charge to a boost capacitor. In particular, while comparator mechanism 212a of FIG. 4A is DC-coupled to nodes Vx and BST, comparator mechanism 212b is AC-coupled to such nodes and can be used, for instance, in implementations where it is desired to place the control circuitry outside of the $V_{BST}$ to Vx supply domain. In the example of FIG. 4B, comparator mechanism 212b includes a voltage comparator 404 and a pair of capacitors C1 and C2. C1 is coupled to a first input of comparator 404, and C2 is coupled to a second input of comparator 404. C1 is coupled between the first input to comparator 404 and BST node 206, while C2 is coupled between the second input to comparator 404 and the Vx node 132. Capacitors C1 and C2 are included to level shift the respective boost capacitor voltages sensed at nodes Vx and BST to inputs of comparator 404 and can also be used to store a voltage offset to set the effective voltage threshold of the comparator.

Figure 4C:
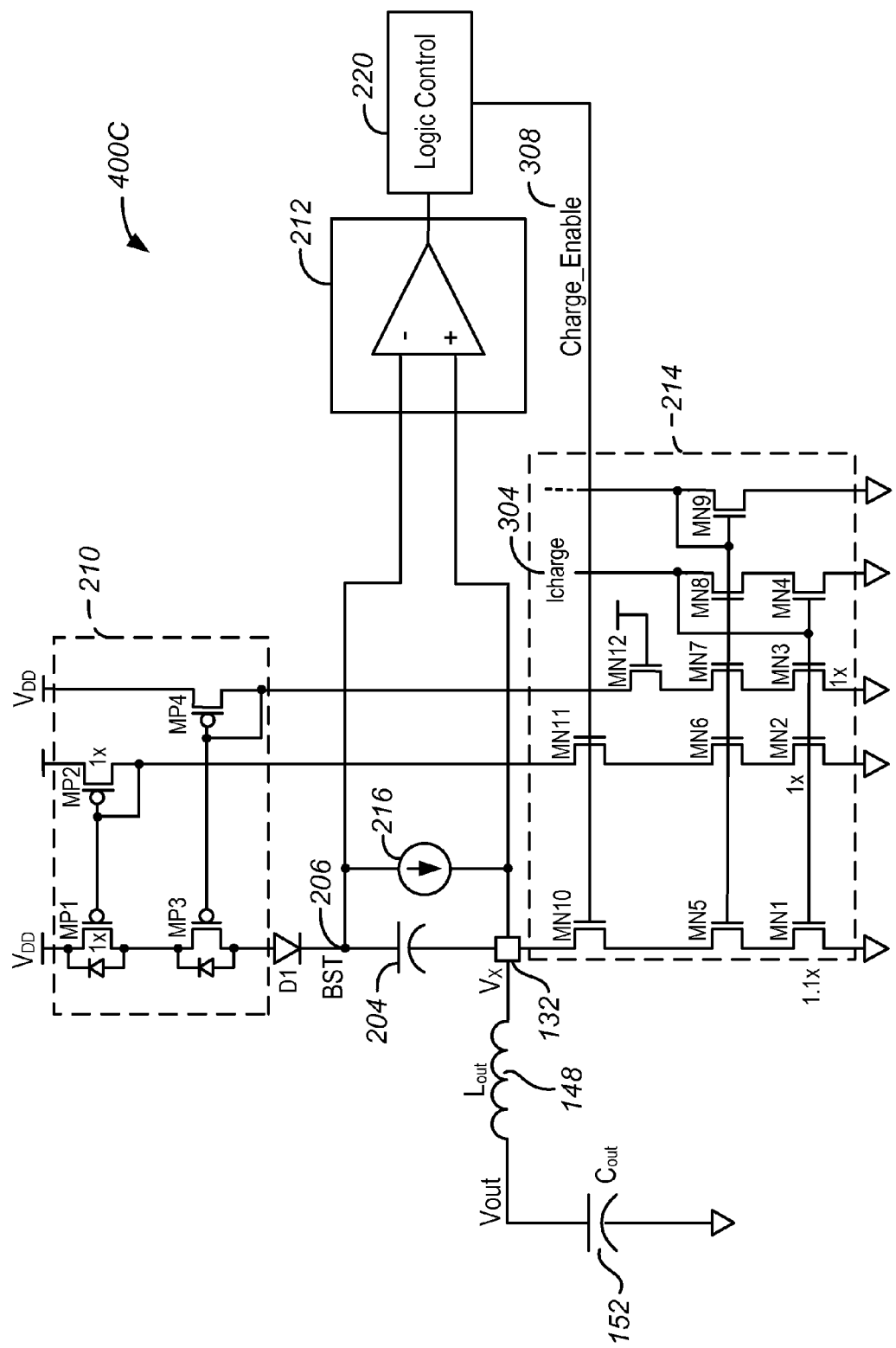
FIG. 4C is a simplified diagram of examples of components of a control circuit 400C for providing charge to and removing charge from a boost capacitor of a voltage regulator, according to an embodiment of the invention.

FIG. 4C is a simplified diagram of examples of components of a control circuit 400C for providing charge to and removing charge from a boost capacitor of a voltage regulator, according to an embodiment of the invention. FIG. 4C shows alternative implementations of charge delivery mechanism 210 and charge removal mechanism 214. In this diagram, a current source 216 is illustrated to represent any static current flowing from node BST to node Vx, such as current from active circuitry or from transistor drain to source leakages or otherwise inactive transistors.

In FIG. 4C, Icharge 304 is provided to FET MN4 of one implementation of charge removal mechanism 214, which is mirrored at FETs MN1, MN2, and MN3 of charge removal mechanism 214. In this way, FET MN1 provides a removal current to the Vx node of capacitor 204 through FETs MN5 and MN10 of charge removal mechanism 214.

In FIG. 4C, the current at FET MN2 is mirrored to FET MP2 of charge delivery mechanism 210 through FET MN6 and FET MN11. The current at FET MP2 is mirrored to FET MP1, both of which are coupled to the $V_{DD}$ supply voltage. The example of FIG. 4C incorporates a cascode in the form of transistors MP3 and MP4. This cascode can be omitted in other examples. In this particular example, the current at FET MP1 passes through FET MP3, the gate of which is connected to the gate of FET MP4. FET MP4 is coupled to $V_{DD}$, as shown in FIG. 4C. In this way, FET MP1 provides a charging current to the BST node of capacitor 204 through diode D1.

In FIG. 4C, a removal current is delivered from charge removal mechanism 214 to Vx node 132 of boost capacitor 204, and a charging current is provided by charge delivery mechanism 210 to BST node 206 of boost capacitor 204. In some implementations, as shown in FIG. 4C, the removal current provided to Vx node 132 is equal to or larger than the charging current flowing to BST node 206. To achieve this configuration, the FETs MN1 and MP1 can be constructed to have different surface areas on the chip. In one example of FIG. 4C, FET MP1 has a size of "1×," and FET MN1 has a slightly larger size of "1.1×". Thus, in this implementation, FET MP1 outputs a somewhat smaller charging current than FET MN1, that is, according to the ratio of the size of FET MP1 to FET MP2 and FET MN1 to FET MN4. Because the current provided at MN1 is larger than the current at MP1, the net current at node Vx, will cause capacitor 152 to discharge. This is intended to prevent the output voltage, Vout, from drifting to a high voltage due to undesirably charging of capacitor 152 if the current provided at MN1 is smaller than the current at MP1.

In the example of FIG. 4C, charge removal mechanism 214 includes FETs MN10 and MN11, which serve as on-off switches. The gates of these FETs are coupled to receive a control signal, "Charge_Enable" 308, from charge control mechanism 208. For instance, the Charge_Enable 308 signal can be provided from comparator mechanism 212 through logic control module 220. When charge control mechanism 208 causes FETs MN10 and MN11 to switch off, the currents otherwise delivered to boost capacitor 204 from FET MN1 and FET MP1 are cut off. For instance, in one configuration, FETs MN10 and MN11 can be turned off by pulling the gates of FETs MN10 and MN11 to ground.

Figure 5A:
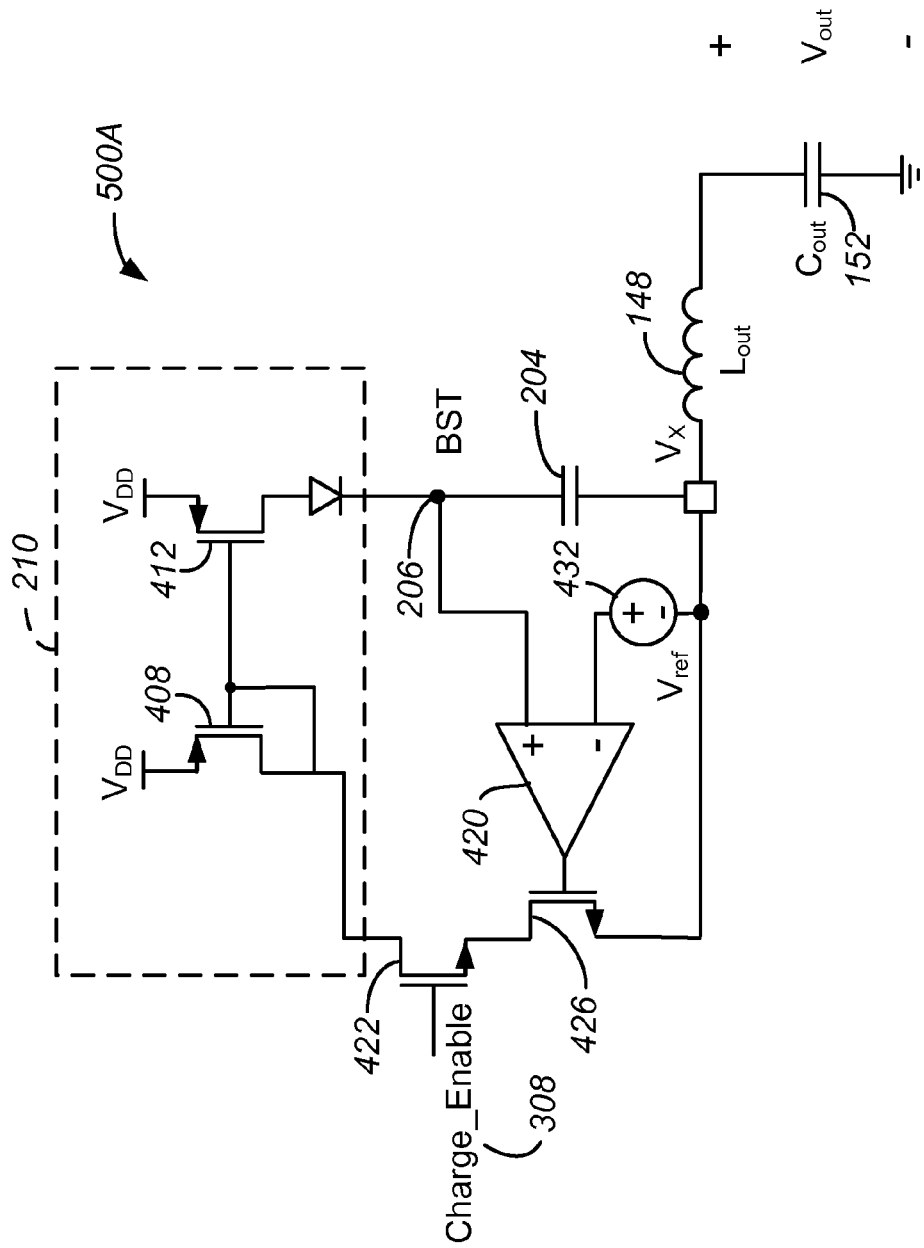
FIG. 5A is a simplified diagram of a control circuit 500A for providing charge to a boost capacitor of a voltage regulator, according to another embodiment of the invention.

FIG. 5A is a simplified diagram of a control circuit 500A for charge to a boost capacitor of a voltage regulator, according to another embodiment of the invention. FIG. 5A shows an alternative implementation of a charge control mechanism 208 and a charge delivery mechanism 210. In the embodiment of FIG. 5A, the charge control mechanism 208 includes an amplifier, in this example, in the form of op-amp 420 coupled to sense a differential voltage across the boost capacitor 204 and connected with charge delivery mechanism 210 as part of a linear analog feedback loop to provide an analog feedback signal to node BST to continuously adjust the charge delivered to node BST, to maintain the boost capacitor voltage at a Vref value. In this example, op-amp 420 has a first input coupled to sense the voltage at node Vx of the capacitor and a second input coupled to sense the voltage at node BST of capacitor 204, with a Vref value supplied by voltage supply circuitry 432 coupled between the Vx node and op-amp 420. In this embodiment, the op-amp 420 is configured to continuously monitor and adjust the voltage across boost capacitor 204 (BST voltage−Vx voltage) by outputting an analog feedback signal through charge delivery mechanism 210 to the BST node such that the voltage at the BST node regulated to the designated reference voltage, Vref.

In FIG. 5A, an alternative implementation of a charge delivery mechanism 210 includes current mirror transistors 408 and 412 similarly coupled as described above with reference to FIG. 4A. However, in FIG. 5A, the drain of FET 408 is coupled to the output of op-amp 420 through switch 422 and FET 426. Thus, in this implementation, FET 426, switch 422, and charge delivery mechanism 210 cooperate with the op-amp 420 to define the analog feedback loop of control circuit 400C and provide the charging current to the BST node. This is another implementation of the switch location as an alternative to FIG. 4A, in which the switch is inside the charge delivery mechanism.

In FIG. 5A, control circuit 400C includes an enable switch 422, configured as a FET, which serves as an on-off switch. The gate of this FET is coupled to receive a control signal, "Charge_Enable" 308, which allows the feedback loop incorporating op-amp 420 to be disconnected and connected responsive to control from various circuitry and components, such as a microcontroller. For instance, it may be desirable to control switch 422 such that the feedback loop can only be enabled during discontinuous modes of operation. When the enable switch 422 is turned off, for instance, by using the Charge_Enable signal 308 to pull the gate of the FET of switch 422 low, the current delivered to boost capacitor 204 at node BST by virtue of the feedback loop is cut off.

Figure 5B:
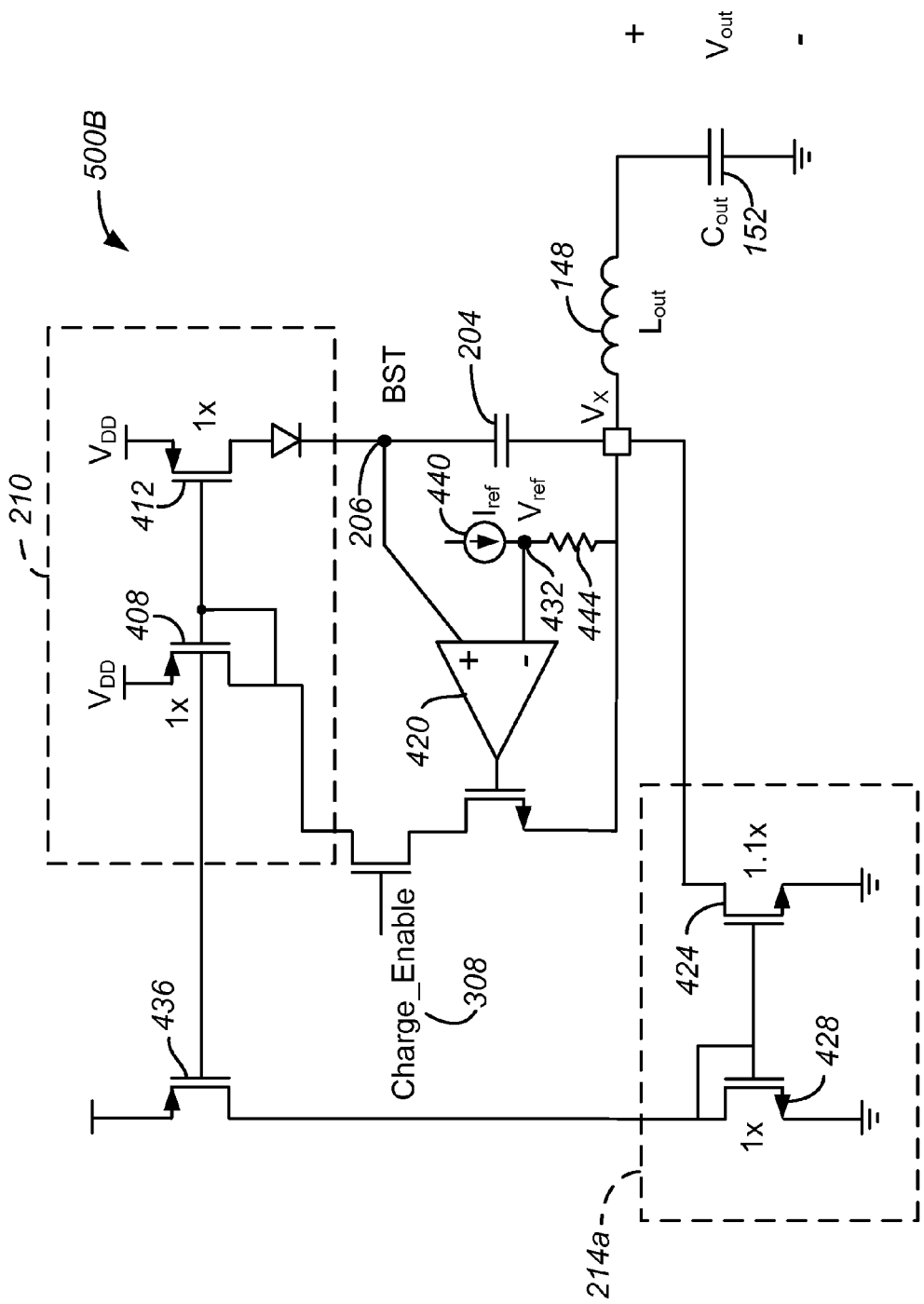
FIG. 5B is a simplified diagram of a control circuit 500B for providing charge to and removing charge from a boost capacitor of a voltage regulator, according to another embodiment of the invention.

FIG. 5B is a simplified diagram of a control circuit 500B for providing charge to and removing charge from a boost capacitor of a voltage regulator, according to another embodiment of the invention. FIG. 5B includes one implementation of a charge delivery mechanism 210, with transistors 408 and 412 coupled as described above with reference to FIG. 5A. FIG. 5B shows another implementation of a charge control mechanism 208 including an op-amp 420 coupled as part of essentially the same feedback loop as described above with reference to FIG. 5A. Here, the reference voltage, Vref, is implemented as a current source 440 providing a reference current, Iref, across a resistor 444. A charging current is delivered from charge delivery mechanism 210 to the BST node of boost capacitor 204 in the form of an analog feedback signal, as described above.

FIG. 5B also shows one implementation of a charge removal mechanism 214 operatively coupled to remove charge from the Vx node of boost capacitor 204. In the example of FIG. 5B, the current delivered to charge delivery mechanism 210 from the output of op-amp 420 is mirrored through current mirror FET 436 to charge removal mechanism 214. In this implementation, charge removal mechanism 214 includes FETs 428 and 424 configured as a current mirror, with sources of the FETs 428 and 424 connected to ground.

In some implementations, as in FIG. 5B, the removal current provided to Vx node 132 is equal to or larger than the charging current flowing to BST node 206. To achieve this configuration, one or both of the FETs 424 and 428 included in charge removal mechanism 214 can be constructed to have larger surface areas on the chip than FETs 408 and 412 of charge delivery mechanism 210. For example, FET 428 can have a size of "1×," and FET 424 can have a slightly larger size of "1.1×". In other examples, FET 428 and/or FET 424 can have a size of 2×, 5×, 10×, etc., depending on the desired implementation. These sizes are proportional to the current capable of being output from the respective FETs. Thus, when FETs 408 and 412 have the 1× size, FETs 408 and 412 are configured to deliver a somewhat smaller charging current to node BST than the removal current from FETs 424 and 428, that is, according to the ratio of the size of FET 424 or FET 428 to FETs 408 and 412. In the example of FIG. 5B, because the removal current provided at node Vx is larger than the current at BST, the difference will cause capacitor 152 to discharge through charge removal mechanism 214. This is intended to prevent the output voltage, Vout, from drifting to a high voltage due to possible charging of output capacitor 152. In some other implementations, the sizes of the various FETs in the charge delivery mechanism 210 and charge removal mechanism 214 are identical, so the current flowing out of node Vx into the charge removal mechanism is the same as the current flowing into node Vx through boost capacitor 204.

Depending on the desired implementation, different devices, apparatus, circuitry, components, mechanisms, modules, and/or units described herein can be fabricated so that they share the same substrate, e.g., are on the same die or chip. In an alternative implementation, such devices, apparatus, circuitry, components, mechanisms, modules, and/or units can be fabricated on different substrates, e.g., on different chips. In either implementation, such devices, apparatus, circuitry, components, mechanisms, modules, and/or units can be provided in the same or different packages. For instance, in FIG. 1A, the controller 112, the power switch 102, and the output filter (including inductor 148 and capacitor 152) can be located on the same or different chips. The charge delivery mechanism 210 can be on the same or different chip as boost capacitor 204, and mechanism 210 and boost capacitor 204 can be on the same or different chip as power switch 102 of FIG. 1A. In FIG. 3A, a charge control mechanism 208 can be fabricated on a chip and a charge delivery mechanism 210 can be located on the same chip. In another example, charge control mechanism 208 and charge delivery mechanism 210 could be fabricated on different chips, interconnected with one another as described above and provided in the same package. In another example, part or all of the mechanisms and components of FIGS. 2B-5B could be fabricated on the same chip with one or more of the mechanisms and components of the voltage regulators of FIGS. 1A and 1B. For example, one or more of the mechanisms of FIGS. 2B-5B could be incorporated into the controller 112 of FIGS. 1A and 1B. In another example, one or more of the mechanisms of FIGS. 2B-5B could be implemented in a discrete controller separate from other mechanisms and components in the embodiments described herein.

While the disclosed subject matter has been particularly shown and described with reference to specific embodiments thereof, it will be understood by those skilled in the art that changes in the form and details of the disclosed embodiments may be made without departing from the spirit or scope of the invention. The present invention should of course, not be limited to the depicted embodiments. In addition, although various advantages and aspects of the disclosed subject matter have been discussed herein with reference to various embodiments, it will be understood that the scope of the invention should not be limited by reference to such advantages and aspects. Rather, the scope of the invention should be determined with reference to the appended claims.

What is claimed is:

1. Power switch control circuitry for controlling a power switch of a voltage regulator, the power switch control circuitry comprising:
   a capacitor having a first terminal and a second terminal;
   charge delivery circuitry coupled to the first terminal of the capacitor to define a charging node, the charge delivery circuitry configured to provide a charging current to the capacitor;
   charge control circuitry coupled to the charge delivery circuitry, the charge control circuitry configured to selectively allow the providing of the charging current to the capacitor, the charge control circuitry including a comparator having a first input and a second input, the first input of the comparator coupled with the first terminal of the capacitor, the second input of the comparator coupled with the second terminal of the capacitor;
   an output filter coupled with the second terminal of the capacitor and the second terminal of the comparator to define an output node; and
   charge removal circuitry coupled to the output node, the charge removal circuitry configured to remove current from the output node based on a determination of the comparator that a voltage differential between the output node and the charging node has crossed a threshold voltage, the current removed from the output node exceeding current provided to the output node from the capacitor.

2. The power switch control circuitry of claim 1, the comparator being DC-coupled to the capacitor terminals.

3. The power switch control circuitry of claim 1, the comparator being AC-coupled to the capacitor terminals.

4. The power switch control circuitry of claim 1, the charge control circuitry including:
   an amplifier coupled to sense the voltage differential across the capacitor, the amplifier operatively coupled to provide a feedback signal to drive the capacitor voltage to a reference voltage.

5. The power switch control circuitry of claim 4, the amplifier coupled to provide the feedback signal to the charge delivery circuitry, the charging current being the feedback signal.

6. The power switch control circuitry of claim 4, the amplifier and the charge delivery circuitry forming at least a portion of a feedback loop.

7. The power switch control circuitry of claim 1, the charge control circuitry coupled to the charge removal circuitry, the charge control circuitry configured to selectively allow the removal of the current from the output node of the power switch.

8. The power switch control circuitry of claim 1, the charge delivery circuitry including one or more current mirror transistors configured to provide the charging current.

9. The power switch control circuitry of claim 1, further comprising:
one or more switches operatively coupled with the charge delivery circuitry to allow the providing of the charging current to the capacitor.

10. The power switch control circuitry of claim 9, the charge control circuitry including:
a logic control module coupled to control the one or more switches.

11. The power switch control circuitry of claim 1, the charge delivery circuitry comprising:
a diode coupled to the capacitor, the diode configured to prevent backflow of the charging current from the capacitor.

12. The power switch control circuitry of claim 1, the capacitor operatively coupled to provide charge to drive a high side switch component of the power switch.

13. The power switch control circuitry of claim 12, the high side switch component being a FET, the capacitor operatively coupled to provide charge to a gate of the FET.

14. A process for controlling a power switch of a voltage regulator, the process comprising:
sensing a voltage across a capacitor coupled to an output node corresponding to an output filter of the voltage regulator and coupled to a charging node at an output of a charge delivery mechanism, the sensed voltage being a voltage differential between the output node of the power switch and the charging node; and
selectively allowing the providing of a charging current at the charging node coupled to the capacitor responsive to the sensed voltage; and
removing current from the output of the power switch, the current removed from the output node of the power switch exceeding current provided to the output node of the power switch from the capacitor, the removal of the current based on the sensed voltage crossing a threshold voltage the charging and removing based on a determination of a comparator of a charge control circuitry that the sensed voltage has crossed the threshold voltage, the comparator having inputs coupled across the capacitor.

15. The process of claim 14, the providing of the charging current being selectively allowed responsive to the sensed voltage crossing a threshold value.

16. The process of claim 14, the charging current being a feedback signal based on the sensed voltage.

17. The process of claim 16, the charging current being the feedback signal.

18. The process of claim 14, further comprising:
selectively allowing the removal of current from the output of the power switch.

19. A process for controlling a power switch of a voltage regulator, the process comprising:

sensing a voltage across a capacitor coupled to an output corresponding to an output filter of the voltage regulator and coupled to a charging node at an output of a charge delivery mechanism, the sensed voltage being a voltage differential between the output of the power switch and the charging node; and
determining that a high side switch component of the power switch has an off state and a low side switch component of the power switch has the off state;
when it is determined that the high side switch component and the low side switch component have the off state, selectively allowing the providing of a charging current to the capacitor responsive to the sensed voltage;
providing a current from the capacitor to the output of the power switch; and
removing current from the output of the power switch, the current removed from the output of the power switch exceeding the current provided to the output of the power switch from the capacitor, the removal of the current based on the sensed voltage crossing a threshold voltage, the providing of the charging current and removing current based on a determination of a comparator of a charge control circuitry that the sensed voltage has crossed the threshold voltage, the comparator having inputs coupled across the capacitor.

20. A voltage regulator comprising:
an output filter capable of being coupled to a load;
a power switch coupled to the output filter at a switching node, the power switch configured to provide a first voltage at the switching node during a first conduction period and a second voltage at the switching node during a second conduction period;
a capacitor having a first terminal and a second terminal, the first terminal coupled to the switching node;
charge delivery circuitry coupled to the second terminal of the capacitor, the charge delivery circuitry configured to provide a charging current to the capacitor;
charge control circuitry coupled to the charge delivery circuitry, the charge control circuitry configured to selectively allow the providing of the charging current to the capacitor, the charge control circuitry including a comparator having a first input and a second input, the first input of the comparator coupled with the first terminal of the capacitor, the second input of the comparator coupled with the second terminal of the capacitor; and
charge removal circuitry coupled to the output of the power switch, the charge removal circuitry configured to remove current from the output of the power switch, the current removed from the output of the power switch exceeding current provided to the output of the power switch from the capacitor, the current removed based on a determination of the comparator that a differential voltage between the first terminal and the second terminal of the capacitor has crossed a threshold voltage.

21. The voltage regulator of claim 20, the charge control circuitry including:
an amplifier coupled to sense the differential voltage across the capacitor, the amplifier operatively coupled to provide a feedback signal to drive the capacitor voltage to a reference voltage.

22. The voltage regulator of claim 21, the amplifier coupled to provide the feedback signal to the charge delivery circuitry, the charging current being the feedback signal.

23. The voltage regulator of claim 20, the current removed from the output of the power switch exceeding current provided to the output of the power switch from the capacitor.

24. The voltage regulator of claim 20, the power switch including a high side switch component coupled between the first voltage and the switching node.

25. The voltage regulator of claim 24, the high side switch component including a transistor.

26. The voltage regulator of claim 25, the transistor being a field effect transistor ("FET").

27. The voltage regulator of claim 26, the FET being an n-channel FET.

28. The voltage regulator of claim 20, the power switch including a low side switch component coupled between the second voltage and the switching node.

29. The voltage regulator of claim 28, the low side switch component including a transistor.

30. The voltage regulator of claim 28, the low side switch component including a diode.

31. The power switch control circuitry of claim 1, wherein the charge control mechanism is configured to selectively allow the providing of the charging current to the capacitor based on a differential voltage across the capacitor.

\* \* \* \* \*